Patented June 24, 1947

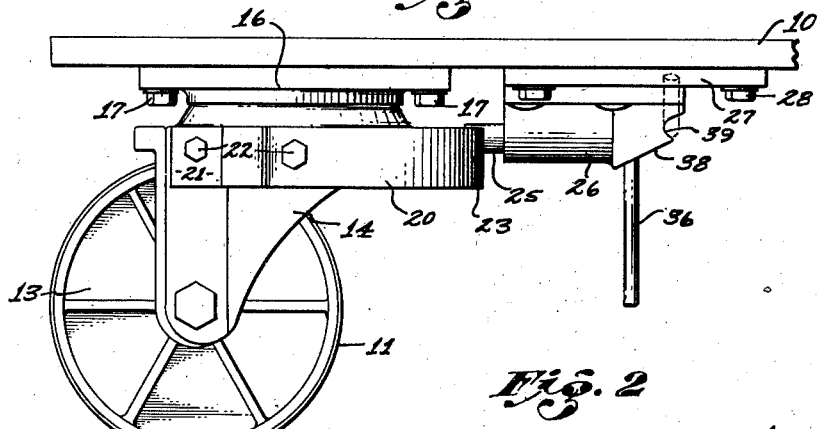

2,422,892

UNITED STATES PATENT OFFICE 2,422,892

CASTER LOCKING ATTACHMENT

Frederick H. Forbes, Pasadena, and Charles F. Forbes, Los Angeles, Calif.

Application August 14, 1944, Serial No. 549,344

3 Claims. (Cl. 16—35)

The present invention relates to locking attachments for casters such as are used on platform trucks used for moving merchandise in buildings, yards and on loading platforms and wharves.

The trucks or dollies referred to ordinarily are equipped with four casters or swivelled wheels with the result that it is difficult to guide the trucks. Especially it is true that such trucks are difficult to steer around corners or into small spaces and ordinarily it is necessary to use two men to properly handle the truck. In some instances a number of platform trucks are formed into a train pulled by a small tractor or power driven vehicle and when such a train is made up of a number of trucks mounted on casters the train is extremely difficult to keep in a straight line. With the present invention the above mentioned objections are obviated.

Generally this invention consists of an attachment that may be readily attached to any of the common forms of platform trucks, that is, a latch bolt engaging member is secured to the caster and a latch bolt assembly attached to the underside of the platform of the truck, the latch bolt assembly being universal in the sense that the assembly may be mounted at either side of the platform in such position that the latching bolt operating mechanism is readily accessible.

It is an object of the present invention to provide a caster locking attachment for platform trucks and the like of simple form and construction which may be readily attached and simply operated.

Other objects and advantages will appear hereinafter from the following description and drawings.

Referring to the drawings, which are for illustrative purposes only.

Fig. 1 is a side elevational view of a caster on a platform of a truck showing a locking attachment mounted on the platform embodying a form of the present invention;

Fig. 2 is a bottom plan view of the caster and locking attachment shown in Fig. 1;

Fig. 3 is a longitudinal sectional view on line 3—3, Fig. 2;

Fig. 4 is a sectional elevational view of the attachment showing the bolt in retracted position;

Fig. 5 is a fragmentary face view of the bolt engaging rail with the bolt in section; and Fig. 6 is an end view of the locking attachment.

Referring more particularly to the drawings, the numeral 10 designates a portion of the platform of a truck and 11 designates one of the truck wheels mounted on the truck so that it may swivel through an entire circle. The wheel 11 is rotatably mounted on a bolt 12 supported in arms 13 extending downwardly from a plate 14 rotatably mounted on a bolt 15 which is supported in a stationary base plate 16 secured to the underside of the platform 10 by means of bolts 17. The bolt 15 extends through a disk 18 on the underside of the rotatable plate 14 against bearing balls 19 mounted in a race formed in the underside of the stationary base plate 16.

The caster and its associated parts just described is of conventional form and it is to be understood that the present invention is not limited for use with the particular type of caster shown but may be used with any of the common forms of casters.

In the form shown a curved latch bolt engaging member is used which consists of a curved rail or band 20, the open ends 21 of which are secured to the legs 13 of the caster by means of bolts 22. The curved portion 23 of the rail 20 is eccentric to the pivotal axis of the caster and is provided with a notch 24 in the upper edge of the rail, the notch 24 being so located that when such notch is engaged by the latching bolt indicated at 25 the caster will be held substantially on a parallel line with the side of the truck body. In other words, the caster will be held in such position that force applied to the truck will cause the truck to move directly forward or backward in a straight line. It is to be understood that the member attached to the caster may be made in different forms to adapt itself to the particular caster upon which the member is mounted, it being only necessary that the member shall swing into the path of the latching bolt.

The latch bolt 25 is mounted in a housing 26 which is secured to a plate 27, the plate being mounted on the under face of the truck platform by means of bolts 28. The housing 26 is provided with a bore 30 which receives the latch bolt 25, the bore 30 being reduced in diameter as indicated at 31 which receives a rod indicated at 32 forming part of the latch bolt. The outer end of the rod is provided with a sleeve indicated at 33 through which one end of the rod 32 extends and to which the outer end of the sleeve 33 is welded or otherwise secured. In the bore 30 and behind the sleeve 33 is a coiled spring 34, one end of the spring pressing against the sleeve and the other end of the spring pressing against a shoulder 35 formed in the bore 30.

In the form shown the inner end of the rod 32 is bent downwardly to form a handle 36 by means of which the latch bolt may be retracted against the pressure of the spring 34. The handle extends between two cam faces 38 formed on the housing and which cam faces diverge outwardly from the handle when the bolt 25 is in extended or engaging position. At the base of the cam faces 38 are notches 39 which receive the handle 36 as hereinafter described.

The housing is provided with the two cam faces 38 which permit the mounting of the locking attachment on the platform of the truck behind the casters on either side of the truck so that the handle may be reached from the side of the truck and pulled rearwardly and toward the operator until it engages a notch 39 in the cam face adjacent the side of the truck upon which the locking mechanism is mounted. No change is required in the attachment regardless of which side of the truck the attachment is mounted.

As shown in Figs. 1 to 3 inclusive, the latching bolt is in engagement with the notch 24 in the rail 20 and, as indicated above, when so engaged the truck will travel straight, either backward or forward. To free the caster from the locking attachment the handle is pushed radially against the action of the spring and against one of the cam faces until the handle seats itself in the notch 39 and when in such position the bolt is retracted from engagement with the band 20 and the caster is free to swing independently of the locking attachment. It is pointed out that the handle is not pulled on the axial line of the latch bolt but is swung radially against the cam face, thereby exerting a greater retracting force than when pulled in a straight line.

When it is desired to lock the caster against swivelling movement, the handle 36 is released from the notch 39 and due to the action of the spring 34 the bolt moves into engaging position. This can be done regardless of the position of the caster and the rail 20 thereon, as for instance, the rail may be in the position shown in dotted lines at 20¹ in Fig. 2, in which case when the truck is manipulated to straighten the wheels the end of the latch bolt will ride on the curved face of the rail until the bolt engages in the notch 24.

It is to be understood that when the latch is retracted into the position shown in Fig. 4 the swivel may make a free complete circular movement.

Although one form of the invention has been particularly shown and described, it is contemplated that various changes and modifications can be made without departing from the scope of the invention and it is intended to cover such changes and modifications as come within the scope of the claims.

We claim as our invention:

1. A caster locking attachment for casters having a latch receiving member comprising: a latch housing; a latch bolt slidably mounted in a bore in said housing; said latch bolt comprising a rod a sleeve secured at its outer end to the outer end of the rod; a coiled spring in said bore between a shoulder in said bore and the inner end of said sleeve; said rod having its inner end bent radially of the axis of the bolt to form a handle; and angularly disposed cam faces on said housing diverging outwardly from said latch bolt engageable by said handle and each having a handle receiving notch formed therein.

2. A caster locking attachment for casters having a latch receiving member comprising: a latch housing; a latch bolt slidably mounted in a bore in said housing, said latch bolt comprising a rod, and a sleeve secured at its outer end to the outer end of the rod; a coiled spring in said bore between a shoulder in said bore and the inner end of said sleeve; said rod having its inner end bent radially of the axis of the bolt to form a handle; and an angularly disposed cam face on said housing diverging outwardly from said latch bolt engageable by said handle and having a handle receiving notch formed therein.

3. In anti-swivel means for a caster having a caster wheel supporting frame mounted for rotation about a vertical axis and adapted to support the caster wheel with its horizontal axis of rotation to one side of said vertical axis, a plate mounted on said frame and presenting an arcuate section outwardly of said frame opposite said caster wheel, said arcuate section being eccentrically disposed with relation to said vertical axis and having a recess for the reception of a locking bolt.

FREDERICK H. FORBES.
CHARLES F. FORBES.

REFERENCES CITED

The following references are of record in the file of this patent:

UNITED STATES PATENTS

| Number | Name | Date |
|---|---|---|
| 1,675,033 | Lefkovityz et al. | June 26, 1928 |
| 1,633,638 | Jarvis et al. | June 28, 1927 |
| 1,723,007 | Bittorf | Aug. 6, 1929 |
| 1,985,363 | Courtney | Dec. 25, 1934 |
| 2,251,567 | Gould et al. | Aug. 5, 1941 |